July 17, 1956 — H. F. HALL — 2,754,744
ROTARY MOLDBOARD PLOW
Filed Feb. 2, 1953 — 3 Sheets-Sheet 1
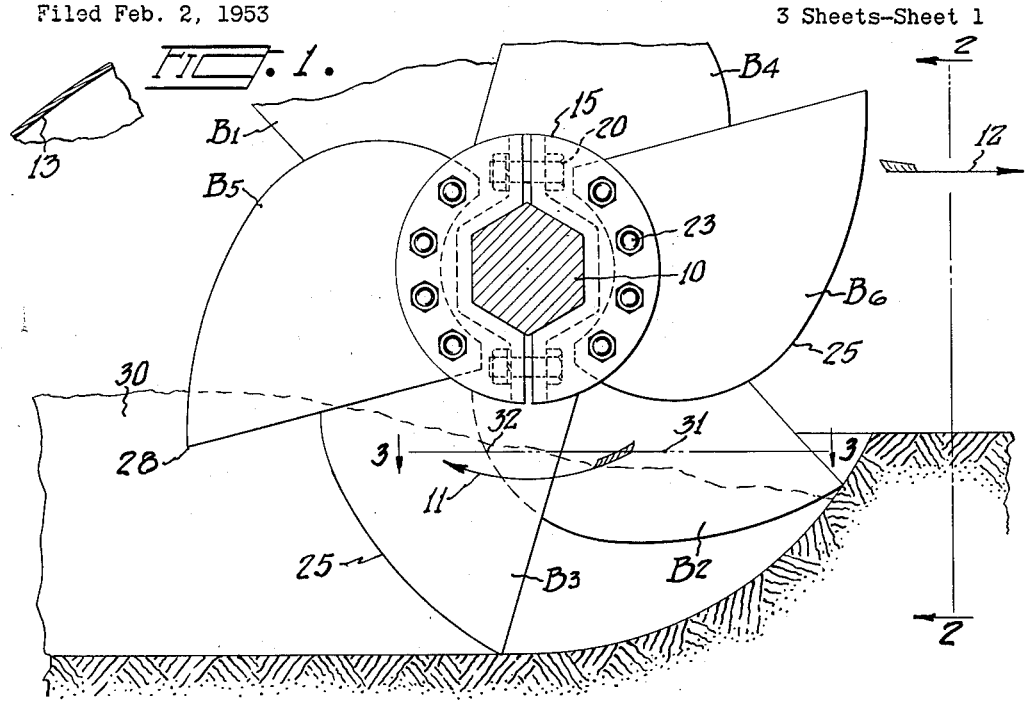
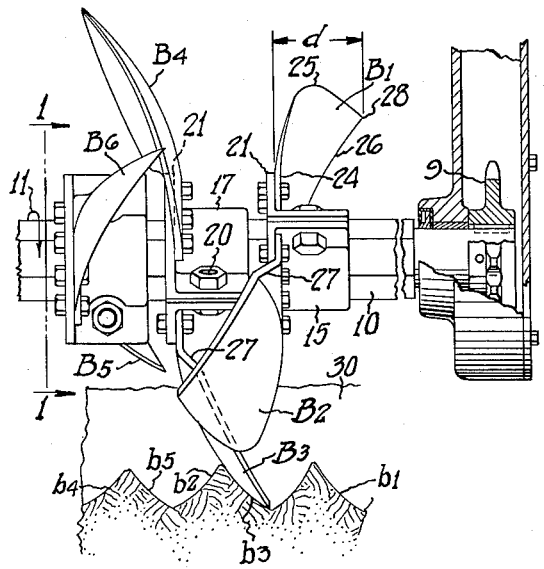
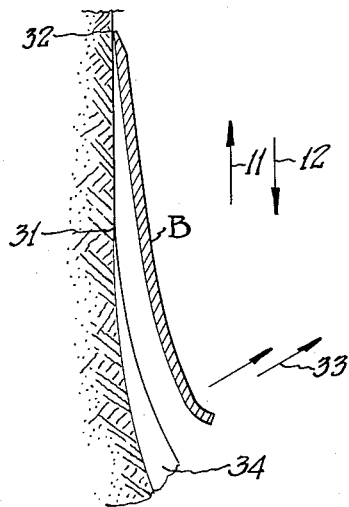
INVENTOR
HAROLD F. HALL
BY Cook and Schermerhorn
ATTORNEYS July 17, 1956  H. F. HALL  2,754,744
ROTARY MOLDBOARD PLOW
Filed Feb. 2, 1953  3 Sheets-Sheet 2
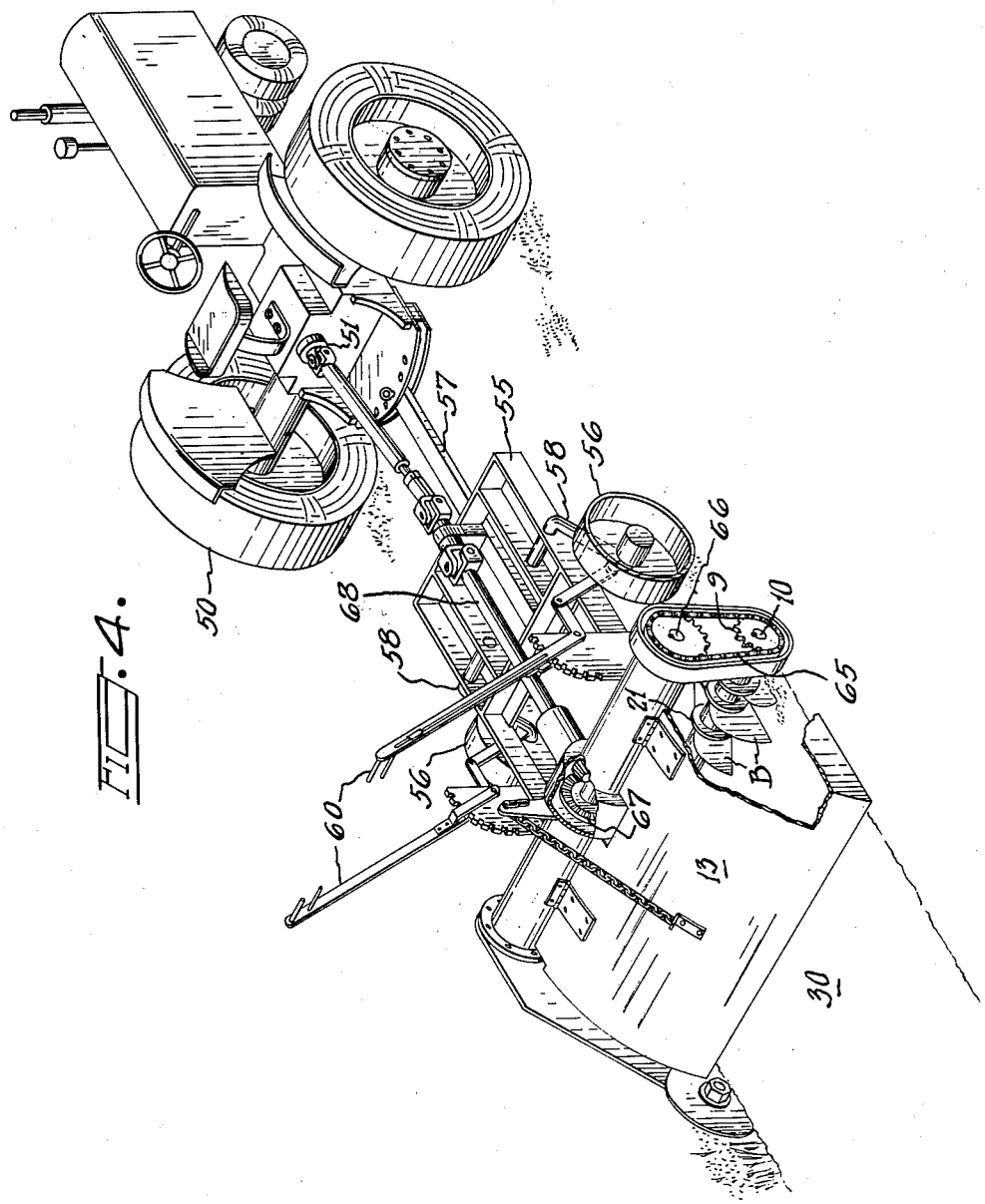
INVENTOR
HAROLD F. HALL
BY
Cook and Schermerhorn
ATTORNEYS July 17, 1956 H. F. HALL 2,754,744
ROTARY MOLDBOARD PLOW
Filed Feb. 2, 1953 3 Sheets-Sheet 3
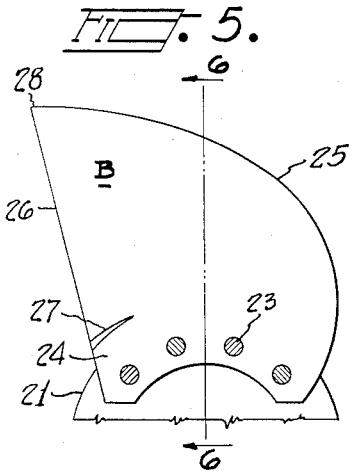
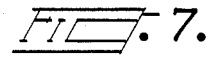
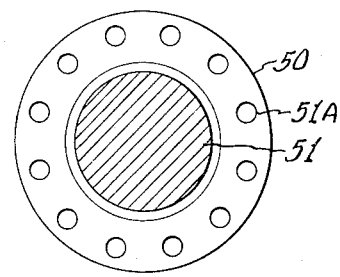
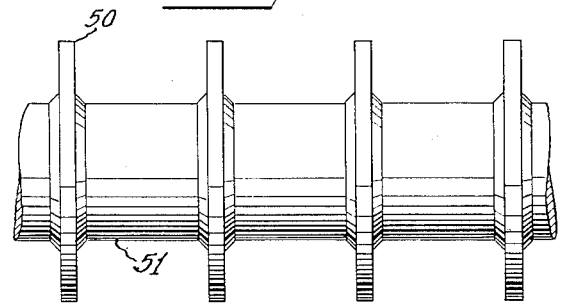
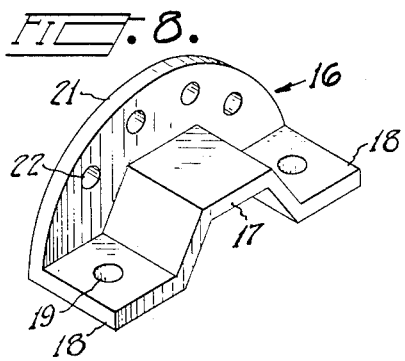
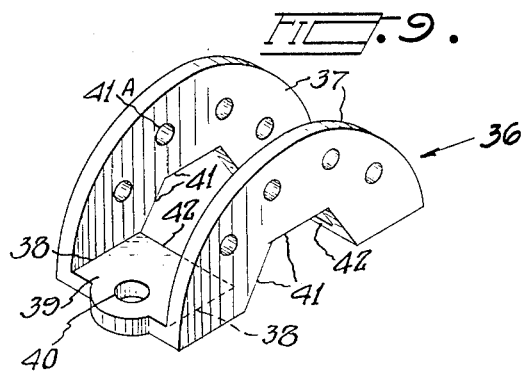
INVENTOR
HAROLD F. HALL
BY
Cook and Schermerhorn
ATTORNEYS

United States Patent Office 2,754,744
Patented July 17, 1956

2,754,744

ROTARY MOLDBOARD PLOW

Harold F. Hall, Portland, Oreg.

Application February 2, 1953, Serial No. 334,693

2 Claims. (Cl. 97—212)

This invention relates to improvements in rotary plows for cutting, pulverizing and mixing soil, grain stubble and cornstalks, as well as fertilizer, cover crops and other vegetable matter. This application is a continuation-in-part of my copending application, Serial No. 738,114, filed March 29, 1947, now Patent No. 2,641,984.

The general objects of the invention are to provide an improved rotary plow construction having a series of cutting blades which are individually removable to facilitate replacement of damaged or worn out blades without disturbing the other blades, to provide a rotary plow construction in which the arrangement of the blades may be widely varied to suit different conditions and purposes, to provide improved means for clamping the blades on the cutter shaft in selected positions, and to provide a relatively simple and economical type of construction which is more rugged and durable than conventional rotary plows.

Another object is to provide a versatile construction wherein certain of the blades may be reversed relative to other blades to produce different effects, such as to form a furrow or ridge to guide drainage or irrigation water, to shift the soil uphill in sidehill plowing, or to chop and distribute stubble, cover crops or fertilizer uniformly for preparing a seed bed or the like.

Another object is to provide an improved shape and arrangement of blades to work and rework the soil and the material to be mixed therewith repeatedly in a single passage of the plow over the ground, whereby a new mode of operation of a rotary plow in the treatment of soil is effected.

The blades of the present plow are designed to slice and overturn the soil in a manner similar to the action of the conventional moldboard plow, but the plowing action is controllable and the soil may be left either in rough furrows or finely pulverized and evenly distributed with a flat surface, as desired, to meet the requirements of the work to be done and the characteristics of the particular soil at the particular season when the ground is worked. The plow construction is such as to render the adjustment for different types of plowing actions simply and quickly effected. This versatility is obtained by the use of removable blades which may be affixed in different arrangements to a power driven shaft mounted in a suitable frame on, or hitched to, a farm tractor. By using more or fewer blades, by varying the axial and angular spacing of the blades on the shaft, and by changing the speed of rotation of the shaft, the plowing action may be controlled so that it is possible with one plow in one operation to accomplish different types of work ordinarily requiring various implements used in succession. The rotary cutting action of the present plow enables soil to be worked that would be too wet to be cultivated by conventional equipment. The motive power to drive the rotary plow shaft may be mounted on the plow unit itself, or it may be supplied from the usual power take-off of the tractor which is used to move the plow over the ground. The speed of the rotor may be adjusted by the usual mechanism for the purpose to produce the kind of action desired with a particular number and arrangement of cutter blades.

The individual cutter blades are relatively inexpensive and are designed to be easily attached to and removed from a plurality of collars or clamp members on the rotary shaft. The blades are of sturdy construction to handle heavy and difficult soil. Ordinary rock does not interfere too seriously with the operation, but if a cutter blade is damaged by a large boulder, it may be easily replaced in the field with a new blade with little effort or loss of time.

The shape of the blades, their arrangement on the shaft and their specific construction are important in accomplishing the desired cutting, pulverizing and mixing actions. The blades have long spiral cutting edges to slice cleanly through the soil rather than to pry or tear it apart, each blade cutting out a slice of soil on each revolution. The blades are dished to provide curved moldboard surfaces for turning over the soil and deflecting it back against the usual enclosing hood to break up lumps and clods. Great strength and rigidity is imparted to the blades by reason of the dished shape without making them excessively thick and heavy.

When the blades are spaced apart longitudinally on the shaft, all facing in the same direction and driven at a relatively slow rotational speed, they may be used to turn over sod in furrows in the general manner of a gang of conventional moldboard plows. In some regions the soil requires plowing that leaves heavy clods which are allowed to disintegrate by the winter rains and other weathering action, and the present plow can thus easily be adjusted to accomplish this purpose.

When the blades are mounted close together on the shaft facing in opposite directions in confronting relation and driven at high speed, they are effective to make puverized seed bed ready for immediate planting, whereby one plow with suitable adjustments may be used to perform the work of the conventional plow, disc and harrow, all in the same operation. The soil may be prepared to a fineness comparable to greenhouse screening to retard the upward capillary movement of moisture from the subsoil. This seed bed texture of the soil need not be limited to the surface layer, but may be extended down to the depth of the blades beneath the ground surface. Improved results in seed bed preparation are thereby obtained. Moisture is held in the soil more effectively and is more evenly distributed to prevent evaporation and, at the same time, complete aeration of the soil is facilitated. In such case a seeder may be attached directly behind the plow to accomplish immediately the sowing of ground which could not otherwise be worked until a late date in the spring. The plow is also well suited to cultivate orchard tracts and similar lands on which cultivating implements are ordinarily used.

The shape of the cutter blades is such as to cause the least possible resistance or ground friction, thereby to reduce the amount of power required to turn over the soil and also the stress on the blades. Cover crops and fertilizers can be mixed into the soil at various depths, as required, by adjusting the height of the cutter shaft, and grain, stubble and stalks can be cut into lengths of from one to four inches, depending upon the number of blades used and the speed of rotation at which the blades are driven. Straw, fertilizers and cover crops are cut to such fineness that they immediately start to decompose and leave no lumps, bunches or wads which are especially objectionable in seed beds. The fineness of the cutting action and the thoroughness and uniformity of the mixing of the vegetation and soil are among the outstanding advantages of the present plow. The soil thus prepared absorbs excessive rain and perimts drainage through the loose soil without a tendency to wash the soil.

With this type of plow there is no need for a hydraulic lift to lift the plow out of the ground at the end of the field, since, by the mere releasing of levers which hold the plow down, the cutter blades immediately work themselves to the surface of the ground and may be allowed to roll freely. The turning of the power unit at the corners of the field does not interfere with the effective use of the plow which may be left in the ground on turns. The plow may be run backward or forward on the ground.

The invention will be better understood and additional objects and advantages will become apparent with reference to the accompanying drawings illustrating different embodiments of the invention.

In the drawings:

Figure 1 is a cross-sectional view of the cutter shaft, taken on the line 1—1 of Figure 2, illustrating a particular arrangement of the blades;

Figure 2 is a fragmentary front elevation view of the cutter shaft, taken on the line 2—2 of Figure 1;

Figure 3 is a sectional view taken on the line 3—3 of Figure 1, showing the cutting action of a blade in the ground;

Figure 4 is a perspective view of the plow coupled to a tractor;

Figure 5 is a view of one of the blades, looking in an axial direction;

Figures 6 and 7 are sectional views taken on the line 6—6 of Figure 5 to illustrate different mounting arrangements for the blades;

Figure 8 is a perspective view of one part of a two-piece removable blade collar of the type shown in Figures 1 and 2;

Figure 9 is a perspective view of a different form of blade collar;

Figure 10 is a fragmentary elevation view of a cutter shaft wherein the blade collars comprise circular flanges welded on the shaft; and Figure 11 is a cross-sectional view of the shaft shown in Figure 10.

The drawings illustrate a rotary plow having a plurality of cutter blades in different angular positions along a shaft mounted in a frame behind a tractor with the shaft driven by some means such as, for instance, a conventional power take-off from the tractor. In Figures 1 and 2, the numeral 10 designates a hexagonal shaft mounted in suitable bearings on the plow frame and carrying a plurality of cutter blades $B_1$, $B_2$, etc. The shaft 10 is driven in the direction of the arrow 11 by a suitable variable speed drive mechanism including a drive sprocket 9 and is preferably mounted at right angles to the direction of travel indicated by arrow 12.

The rotation is preferably in a forward rolling direction, as indicated, but at a speed considerably faster than the rolling speed on the ground, whereby the blades are caused to cut down into the new soil and backwardly beneath the shaft. When the cut material is ultimately thrown clear of the blades it impinges against an enclosing apron or hood 13 which is ordinarily provided on rotary plows. With this direction of rotation, the knife-like cutting edges of the blades chop the stubble, cover crop, straw or manure, as the case may be, down against the ground for the most effective cutting action and discharge this material along with the clods of earth forcibly against the apron to break the clods and finely divide all the material. It is to be understood, however, that with the blade arrangement shown in Figures 1 and 2, this material is first subjected to repeated action by the blades before it is discharged from their zone of action, as will presently be explained.

In Figures 1 and 2, the blades $B_1$, $B_2$, etc., are mounted on collars, designated generally by the numeral 15. Each of the collars 15 comprises two identical parts 16, shown in Figure 8, which are adapted to be bolted together on opposite sides of the shaft. The collar part 16 comprises a three-sided hub portion 17 to fit half way around the hexagonal shaft and equipped with a pair of ears 18 having holes 19 to receive the bolts 20 shown in Figures 1 and 2. Integral with the hub 17 and ears 18 is a semicircular radial flange portion 21 having a plurality of holes 22 for attaching a blade. This type of collar member is preferably made of cast iron or steel. Referring now to Figure 5, it will be observed that each blade B has four holes 23 in a flat arcuate hub portion 24 spaced to register with the holes 22. Thus, each coupling member 16 is adapted to mount one blade, and, when two of the coupling members are secured on the shaft by means of bolts 20, a pair of blades may be carried by the respective coupling members having an angular spacing on the shaft of 180 degrees. Thus, by mounting the collars 15 in different angular positions on the hexagonal shaft, the blades may be spaced at angular intervals of 60 degrees around the shaft as shown in Figures 1 and 2.

The true shape of the blades is best shown in Figures 2 and 5. The blades are curved, both in a radial direction and in a circumferential direction, which is referred to as a compound curvature, to provide a dished contour having a moldboard shape for turning over slices of earth. The dished shape also imparts great strength and rigidity to the blades to resist bending, without excessive thickness and weight. Each blade has a spiral cutting edge 25 extending from the hub portion 24 outwardly and rearwardly to intersect a relatively straight back edge 26.

In order to obtain the desired moldboard shape by a simple stamping or pressing operation on flat steel blanks, the back edge 26 is offset rather abruptly by a pair of reverse bends at 27 extending a short distance into the blade to provide a transition between the flat hub portion 24, which is disposed in a plane perpendicular to the axis of the shaft, and the outwardly extending portion of edge 26 which is deflected at a considerable angle to this plane. The blade tip or point 28 is thereby displaced axially a distance $d$ (Figure 2) from the plane of the flat hub portion 24 and the cutting edge 25 describes a spiral curve in three dimensions. The remainder of the surface of the blade consists of the compound curvature previously referred to extending outwardly from the hub portion 24 and rearwardly from the cutting edge 25 and gradually merging into the straight line portion of the rear edge 26.

A preferred mounting arrangement of the blades for producing the finest possible comminution and intermixing of the soil and vegetable matter for preparing seed beds and the like is illustrated in Figure 2. Each collar 15 carries a left-hand blade and a right-hand blade spaced 180 degrees apart. The left- and right-hand blades are similar but not identical, the curvatures being reversed to move the soil in opposite axial directions relative to the mounting flange 21. Thus, the blade $B_1$ extends to the right of its flange 21 a distance $d$ and the diametrically opposite blade $B_2$ extends a similar distance to the left. The blade $B_1$ thereby slices away the earth to leave a curved surface $b_1$ and the opposite blade $B_2$ slices away the earth to leave a curved surface $b_2$. The next pair of blades $B_3$ and $B_4$ are advanced on the shaft 60 degrees, and the flanges 21 of the two collars 15 are preferably spaced on the shaft a distance approximately equal to the distance $d$, whereby the two blades $B_2$ and $B_3$ overlap each other, as shown. The blade $B_3$ slices a curved furrow or surface $b_3$, and the blade $B_4$ slices a furrow or surface $b_4$ in the positions shown. Similarly, the next blade $B_5$ to the left forms a curved surface $b_5$ on the undisturbed underlying soil.

The slices of earth sheared off in this manner are thereby deflected and thrown against other approaching and confronting blades and thence ultimately upwardly against the enclosing hood 13 with considerable force, whereby the chunks and clods are effectively broken and fall back behind the blades to form a layer 30 of the desired finely worked and intermixed material. Beneath this layer of loose soil extends the ridged surface $b_3$, $b_2$, $b_5$, $b_4$ of the undisturbed earth to hold a quantity of moisture after sprinkling or rainfall and drain off the surplus.

The blade $B_2$ is seen to be in confronting relation to blade $B_3$ and following immediately therebehind to intercept and rework material deflected to the right in Figure 2 from $B_3$. Similarly, $B_6$ is in confronting relation to $B_2$ and following therebehind to receive both the new material sliced by $B_2$ and also a portion of the material previously deflected from $B_3$ to $B_2$. Again, $B_4$ is in trailing and confronting relation to $B_6$ to intercept and rework the material deflected therefrom, and so on. Owing to the open spaces between the staggered blades and the relatively high rotational speed, there is ample opportunity for repeated transfer of the material back and forth between different confronting blades to rework the material again and again before it escapes from the field blade activity. Also, it will be observed with reference to Figure 1 that the width and angular displacement of the blades is such as to obstruct any free path in an axial direction and hence prevent escape of the material without the described reworking. The material is trapped for an interval of time and kept in violent motion before it can exit radially. Viewed from the end of the shaft as in Figure 1, it will be seen that the blades are mounted at 60 degree intervals around the shaft and have sufficient width to overlap in a circumferential direction and substantially close all gaps in each six blade group.

In the blade arrangement shown in Figure 2, greater axial overlapping or crossing of the blades may be obtained with the same spacing of the collars 15 by mounting the blades of each pair on opposite sides of the flange 21, as shown diagrammatically in Figure 6. Blade $B_1$ is mounted as shown in Figure 2, but blade $B_2$ has been shifted to the left side of flange 21. Conversely, the axial overlap may be reduced by leaving blade $B_2$ on the right side of flange 21 and shifting blade $B_1$ to the left side as shown in Figure 7.

Other blade arrangements may be used to produce different plowing effects. A lesser number of collars and blades may be mounted on the shaft with the collars spaced farther apart, and the right-hand blades may all be mounted on one end of the shaft and the left-hand blades mounted on the other end to shift the soil laterally toward or away from the center of the plow. It is also possible to mount a pair of blades on one of the end collars faced in the opposite axial direction from the adjacent blades to form either a furrow or ridge along one side of the plowed strip for retaining water or other purposes. Each collar may carry a single blade instead of a pair. All the various possible arrangements and combinations of right- and left-hand blades on the shaft need not be described in detail, as they will be obvious to persons familiar with the use of rotary plows.

Figure 3 illustrates the slicing action of a blade as it enters the soil and the moldboard plow action in slicing and turning over the equivalent of a small furrow. By rotating the blades relatively slowly, such slices are turned over and not deflected and broken up to the degree that they are when the blades are rotated fast. The two points 31 and 32 occupy the relative positions in the earth shown in Figure 1. As the cutting edge of one of the blades passes the respective points the moldboard curvature overturns and deflects the slice axially in the direction of arrows 33. On its next revolution, the blade removes another slice at 34 as the plow moves forward in the direction of arrow 12. As pointed out hereinabove, the finest comminuting action is obtained when right- and left-hand blades face each other in overlapping relation and trailing positions, and rotating at a relatively high speed, so that the slices removed by one blade will be lifted and deflected axially directly into the path of a confronting blade.

The general shape and soil working characteristics of the present type of blade are the same as described in the parent application, but the blade itself has been improved in several respects. The blade has been made broader in a circumferential direction whereby the dished shape of the broadened blade imparts greater strength and rigidity in stamped or pressed sheet steel of the same thickness. The circumferentially longer base portion on the hub end of the blade is stiffened materially by the long arc of clamping engagement with the rigid shaft collar flange which tends to stiffen the whole blade. Also, the greater breadth of blade tends to reduce the chopping action and increase the slicing action by allowing a longer spiral curve on the cutting edge 25 with more sweep-back toward the point 28 where the curvature of the cutting edge approaches concentricity with the shaft. This improves the self-sharpening action in the soil as well as improving the cutting action on heavy clods and tough material such as corn stalks and the like.

Additional advantages of the broader blade are that it insures more re-working of the soil which is deflected back and forth between confronting oppositely dished blades. With the blade arrangement shown in Figure 1, relatively fewer blades are required to insure that all axially deflected particles are intercepted by some blade and re-worked, the particles being afforded little opportunity to pass between the blades in an axial direction without being reworked. Six blades are sufficient to close all the gaps from the shaft out to a point relatively close to the tip circle. The manner of mounting the blades on the shaft has also been improved and simplified.

It will be seen in Figures 1 and 5 that each blade has a breadth approximately equal to its effective length beyond the collar flange, and a long spirally curved cutting edge which starts at the base end of the blade in approximately radial direction and gradually turns and sweeps back toward the tip end of the blade in a curvature which is approximately concentric with the circle of rotation of the tip end of the blade about the axis of the shaft. The compound radial and circumferential curvatures which provide the dished shape of the blade impart great rigidity and strength in such a wide blade.

Figure 9 illustrates a double flange collar member 36 which may be stamped and pressed from flat sheet steel or the like. The flange portions 37 are bent up on the fold lines 38 to leave therebetween two lug portions 39 with holes 40 for attaching two of the members together on opposite sides of the shaft by bolts 20, as explained in connection with the collar member 16 shown in Figure 8. Prior to the bending operation, an opening is punched in the blank having six angular edges 41, to fit three sides of the shaft, interconnected by two parallel edge portions 42, as shown, which also fit against opposite sides of the shaft when two of the members are clamped together around the shaft to make a complete collar. Holes 41 provide for attachment of one, two or four blades as desired. The collar members 36 may be forged or cast, if desired.

Where the intended use of the plow is such that adjustment of the longitudinal spacing of the collars is not necessary, a plurality of circular flanges 50 may be welded on a cylindrical shaft 51 as shown in Figures 10 and 11. By providing twelve holes 51 for the attachment of the blades, twelve different blade positions are made available. Either one or two blades may be attached to each flange collar, and right-hand and left-hand blades may be used in various combinations as described hereinabove to produce the desired type of plowing action. By spacing the collars quite close together on the shaft, blades may be mounted on all the collars to produce a fine comminuting action, and on alternate collars when it is desired to leave furrows in the ground, whereby most of the advantages of the removable collars may be obtained in an integral shaft structure having a minimum number of bolts and nuts to manipulate in changing from one blade arrangement to another.

Figure 4 illustrates one manner in which the plow of the invention may be operated by a tractor 50 having a power take-off 51. The frame 55, equipped with wheels 56, is pulled behind the tractor by a draw bar 57. The wheels are mounted on crank arms 58 which may be raised or lowered relative to the frame 55 by the operation of hand levers 60.

Plow shaft 10 is rotated by a chain drive 65 on a transverse drive shaft 66. Shaft 66 is in turn driven through a bevel gear assembly 67 by a longitudinal drive shaft 68 which is detachably connected through suitable universal joints and extension shafting with the power take-off 51. The desired rotational speed is obtained by manipulation of the power take-off transmission of the tractor in the usual manner.

The frame 55 and equipment carried thereby furnish sufficient weight to hold the plow down to the depth permitted by the adjustment of the wheels 56. By lowering the wheels 56, relative to frame 55, the plow may be raised entirely out of the ground, when desired.

Having now described my invention and in what manner the same may be used, what I claim as new and desire to protect by Letters Patent is:

1. A concavo-convex moldboard blade for a rotary plow, said blade having a hub portion, a relatively straight back edge and a spiral cutting edge, the hub portion of said blade being flat in the plane of rotation of said blade, the tip end of the blade being offset in an axial direction from said plane, the back edge being offset by a pair of reverse bends to provide transition between the hub portion and the axially displaced tip of the blade, the cutting edge initially extending in a substantially radial direction from said hub portion and continuing outwardly and rearwardly through an arc of approximately 90 degrees to intersect said back edge.

2. A rotary plow comprising a horizontal driven shaft disposed transversely of the direction of travel of the plow, a series of radial flanges mounted on siad shaft, and right- and left-hand concavo-convex cutting blades having hub ends mounted on said flanges in different angular positions, each of said blades having a hub portion, a relatively straight back edge, and a spiral cutting edge, the hub portion having a circumferentially extending width in excess of 90 degrees, the cutting edge initially extending in a substantially radial direction from the hub portion and continuing outwardly and rearwardly through an arc of approximately 90 degrees to intersect said back edge, said back edge being offset by a pair of reverse bends to provide a transition with said hub portion, said blades overlapping one another in a circumferential direction for deflecting material back and forth between confronting blades for repeated treatment by the blades in a single passage of the plow.

References Cited in the file of this patent

UNITED STATES PATENTS

| | | |
|---|---|---|
| 503,006 | Sexson | Aug. 8, 1893 |
| 668,001 | Anderson | Feb. 12, 1901 |
| 930,951 | Fox et al. | Aug. 10, 1909 |
| 1,512,484 | Porter | Oct. 21, 1924 |
| 1,951,701 | Major | Mar. 20, 1934 |
| 2,233,727 | Bell | Mar. 4, 1941 |
| 2,357,374 | Ariens | Sept. 5, 1944 |
| 2,679,200 | Johnson et al. | May 25, 1954 |